United States Patent
Yang et al.

(10) Patent No.: US 12,149,298 B2
(45) Date of Patent: Nov. 19, 2024

(54) MEASUREMENT METHOD, RESOURCE CONFIGURATION METHOD, TERMINAL, AND NETWORK-SIDE DEVICE

(71) Applicant: VIVO MOBILE COMMUNICATION CO., LTD., Guangdong (CN)

(72) Inventors: Yu Yang, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 307 days.

(21) Appl. No.: 17/580,528

(22) Filed: Jan. 20, 2022

(65) Prior Publication Data
US 2022/0149960 A1 May 12, 2022

Related U.S. Application Data

(63) Continuation of application No. PCT/CN2020/102089, filed on Jul. 15, 2020.

(30) Foreign Application Priority Data

Jul. 22, 2019 (CN) .......................... 201910663402.2

(51) Int. Cl.
 *H04B 17/336* (2015.01)
 *H04B 7/0417* (2017.01)
 (Continued)

(52) U.S. Cl.
 CPC ......... *H04B 17/336* (2015.01); *H04B 7/0417* (2013.01); *H04B 7/0632* (2013.01); *H04W 24/10* (2013.01)

(58) Field of Classification Search
 None
 See application file for complete search history.

(56) References Cited

U.S. PATENT DOCUMENTS

| | | | |
|---|---|---|---|
| 2015/0222400 A1 | 8/2015 | Xiong et al. | |
| 2015/0327095 A1 | 11/2015 | Kwak et al. | |
| | (Continued) | | |

FOREIGN PATENT DOCUMENTS

| | | |
|---|---|---|
| CN | 108964862 A | 12/2018 |
| CN | 109314871 A | 2/2019 |
| | (Continued) | |

OTHER PUBLICATIONS

CN Office Action in Application No. 201910663402.2 Dated Jun. 15, 2021.
(Continued)

*Primary Examiner* — Anh Ngoc M Nguyen
(74) *Attorney, Agent, or Firm* — Price Heneveld LLP

(57) ABSTRACT

This disclosure provides a measurement method, a resource configuration method, a terminal, and a network-side device. The measurement method applied to a terminal includes: receiving configuration information transmitted by a network-side device, where the configuration information is used to at least indicate measuring an L1-SINR, the configuration information further includes CMR information and IMR information, and there is a preset association relationship between CMRs in the CMR information and IMRs in the IMR information; determining, based on the preset association relationship, a target CMR and a target IMR for measuring a target L1-SINR; and measuring the target CMR and the target IMR separately to obtain the target L1-SINR.

20 Claims, 7 Drawing Sheets

(51) Int. Cl.
*H04B 7/06* (2006.01)
*H04W 24/10* (2009.01)

(56) References Cited

U.S. PATENT DOCUMENTS

| | | |
|---|---|---|
| 2018/0279149 A1 | 9/2018 | Li et al. |
| 2019/0215086 A1 | 7/2019 | Kwak et al. |
| 2020/0007299 A1 | 1/2020 | Han et al. |
| 2021/0092001 A1 | 3/2021 | Yoshioka et al. |
| 2021/0258813 A1 | 8/2021 | Li |
| 2022/0140960 A1* | 5/2022 | Gao ............... H04L 5/0023 |
| | | 370/336 |
| 2022/0286175 A1* | 9/2022 | Matsumura .......... H04B 7/0888 |

FOREIGN PATENT DOCUMENTS

| | | |
|---|---|---|
| CN | 109802794 A | 5/2019 |
| WO | 2019123623 A1 | 6/2019 |

OTHER PUBLICATIONS

"Enhancements on multi-beam operation" 3GPP TSG RAN WG1 Meeting #97, ZTE, R1-1906237, May 13, 2019.
"Discussion on multi-beam based operations and enhancements" 3GPP TSG RAN WG1 Meeting #97, LG Electronics, R1-1906731, May 13, 2019.
"Enhancements to multi-beam operation" 3GPP TSG-RAN WG1 Meeting #97, Ericsson, R1-1907436, May 13, 2019.
European Search Report in Application No. 20843380.5 Dated Aug. 18, 2022.
IN Office Action in Application No. 202227006713 Dated Jul. 7, 2022.
"Remaining details on CSI measurement" 3GPP TSG RAN WG1 Meeting #92, ZTE, Sanechips, R1-1801579, Feb. 26, 2018.
Intel Corporation, Summary 2 on L1-SINR and SCell BFR, 3GPP TSG RAN WG1, Meeting #97, R1-1907825, Reno, USA, May 13-17, 2019.

* cited by examiner

MEASUREMENT METHOD, RESOURCE CONFIGURATION METHOD, TERMINAL, AND NETWORK-SIDE DEVICE

CROSS-REFERENCE TO RELATED APPLICATIONS

This application is a continuation application of International Application No. PCT/CN2020/102089 filed on Jul. 15, 2020, which claims priority to Chinese Patent Application No. 201910663402.2, filed in China on Jul. 22, 2019, which are incorporated herein by reference in their entireties.

TECHNICAL FIELD

This disclosure relates to the field of communication technologies, and in particular, to a measurement method, a resource configuration method, a terminal, and a network-side device.

BACKGROUND

In future 5G mobile communications systems, high bands will be supported. Due to short wavelengths of high-frequency signals, massive antenna arrays can be arranged, that is, massive MIMO (massive antenna) technologies are used. If an all-digital array is used in the massive MIMO technology, maximized spatial resolution and optimal multi-user MIMO (MU-MIMO) performance can be achieved. However, this structure requires a large number of AD/DA converters and a large number of complete radio frequency-baseband processing channels, resulting in high implementation costs and high processing complexity. To reduce the implementation costs and processing complexity, hybrid digital-analog beamforming technologies have emerged.

In the hybrid digital-analog beamforming technologies, to improve accuracy of beam measurement performed by a terminal, a new measurement parameter, layer 1 signal to interference plus noise ratio (L1-SINR), is introduced. However, no corresponding solution has been proposed for how to configure channel measurement resources (CMR) and interference measurement resources (IMR) during measurement of an L1-SINR of a beam, which will affect communication reliability of the communications system.

SUMMARY

According to a first aspect, an embodiment of this disclosure provides a measurement method, applied to a terminal device, where the method includes:
receiving configuration information transmitted by a network-side device, where the configuration information is used to at least indicate measuring a layer 1 signal to interference plus noise ratio L1-SINR, the configuration information further includes channel measurement resource CMR information and interference measurement resource IMR information, and there is a preset association relationship between CMRs in the CMR information and IMRs in the IMR information;
determining, based on the preset association relationship, a target CMR and a target IMR for measuring a target L1-SINR; and
measuring the target CMR and the target IMR separately to obtain the target L1-SINR.

According to a second aspect, an embodiment of this disclosure provides a resource configuration method, applied to a network-side device, where the method includes:
transmitting configuration information to a terminal, where the configuration information is used to at least indicate measuring a layer 1 signal to interference plus noise ratio L1-SINR, the configuration information further includes channel measurement resource CMR information and interference measurement resource IMR information, and there is a preset association relationship between CMRs in the CMR information and IMRs in the IMR information; and
transmitting, according to the configuration information, a reference signal for measuring a target L1-SINR.

According to a third aspect, an embodiment of this disclosure provides a terminal, including:
a receiving module, configured to receive configuration information transmitted by a network-side device, where the configuration information is used to at least indicate measuring a layer 1 signal to interference plus noise ratio L1-SINR, the configuration information includes channel measurement resource CMR information and interference measurement resource IMR information, and there is a preset association relationship between CMRs in the CMR information and IMRs in the IMR information;
a determining module, configured to determine, based on the preset association relationship, a target CMR and a target IMR for measuring a target L1-SINR; and
a measurement module, configured to measure the target CMR and the target IMR separately to obtain the target L1-SINR.

According to a fourth aspect, an embodiment of this disclosure provides a network-side device, including:
a first transmitting module, configured to transmit configuration information to a terminal, where the configuration information is used to at least indicate measuring a layer 1 signal to interference plus noise ratio L1-SINR, the configuration information further includes channel measurement resource CMR information and interference measurement resource IMR information, and there is a preset association relationship between CMRs in the CMR information and IMRs in the IMR information; and
a second transmitting module, configured to transmit, according to the configuration information, a reference signal for measuring a target L1-SINR.

According to a fifth aspect, an embodiment of this disclosure provides a terminal, including a memory, a processor, and a computer program stored in the memory and capable of running on the processor, where when the computer program is executed by the processor, the steps of the measurement method provided in the first aspect of the embodiments of this disclosure are implemented.

According to a sixth aspect, an embodiment of this disclosure provides a network-side device, including a memory, a processor, and a computer program stored in the memory and capable of running on the processor, where when the computer program is executed by the processor, the steps of the resource configuration method provided in the second aspect of the embodiments of this disclosure are implemented.

According to a seventh aspect, an embodiment of this disclosure provides a computer-readable storage medium, where the computer-readable storage medium stores a computer program, and when the computer program is executed by a processor, the steps of the measurement method provided in the first aspect of the embodiments of this disclosure are implemented, or the steps of the resource configuration method provided in the second aspect of the embodiments of this disclosure are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may derive other drawings from these accompanying drawings.

DESCRIPTION OF EMBODIMENTS

The following clearly describes the technical solutions in the embodiments of this disclosure with reference to the accompanying drawings in the embodiments of this disclosure. Apparently, the described embodiments are merely some rather than all of the embodiments of this disclosure. All other embodiments that a person of ordinary skill in the art obtains based on the embodiments of this disclosure shall fall within the protection scope of this disclosure.

In the specification and claims of this application, the term "include" and any other variants mean to cover a non-exclusive inclusion. For example, a process, method, system, product, or device that includes a list of steps or units is not necessarily limited to those steps or units, but may include other steps or units not expressly listed or inherent to such a process, method, product, or device. In addition, in the specification and claims, the use of "and/or" represents presence of at least one of the connected objects, for example, "A and/or B" indicates that the following three cases: only A, only B, or both A and B.

In the embodiments of this disclosure, the terms such as "an example" or "for example" are used to represent an example, an illustration, or a description. Any embodiment or design solution described as "an example" or "for example" in the embodiments of the present disclosure shall not be interpreted to be more preferential or advantageous than other embodiments or design solutions. To be precise, the terms such as "example" or "for example" are intended to present a related concept in a specific manner.

The following describes the embodiments of this disclosure with reference to the accompanying drawings. A measurement and resource configuration method provided in the embodiments of this disclosure may be applied to a wireless communications system. The wireless communications system may be a 5G system, or an evolved long term evolution (eLTE) system, or a later evolved communications system.

Figure 1:
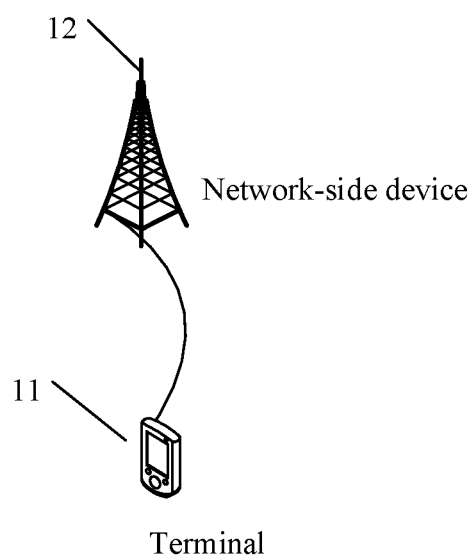
FIG. 1 is a schematic structural diagram of a network system according to an embodiment of this disclosure.

FIG. 1 is a structural diagram of a network system according to an embodiment of this disclosure. As shown in FIG. 1, the network system includes a terminal 11 and a network-side device 12. The terminal 11 may be a mobile communications device, for example, a mobile phone, a tablet computer (Tablet Personal Computer), a laptop computer, a personal digital assistant (PDA), a mobile Internet device (MID), or a wearable device. It should be noted that a specific type of the terminal 11 is not limited in the embodiments of this disclosure. The network-side device 12 may be a 5G network-side device (for example, a gNB or a 5G NR NB), a 4G network-side device (for example, an eNB), a 3G network-side device (for example, an NB), a network-side device in a later evolved communications system, or the like. It should be noted that a specific type of the network-side device 12 is not limited in the embodiments of this disclosure.

Before the technical solutions of the embodiments of this disclosure are described in detail, the massive MIMO technologies will be briefly introduced.

The radio access technology standards such as long term evolution (LTE) or LTE-advanced (LTE-A) are built on the basis of MIMO and orthogonal frequency division multiplexing (OFDM) technologies. In the MIMO technology, spatial freedom obtained by a multi-antenna system is used to improve a peak rate and system spectrum utilization.

As the dimensions of the MIMO technology expand, in Rel-8, up to four layers can be supported for MIMO transmission; in Rel-9, MU-MIMO technology is enhanced, and up to four downlink data layers can be supported for MU-MIMO transmission in transmission mode (TM)-8; and in Rel-10, up to eight data layers can be supported for single-user MIMO (SU-MIMO) transmission.

Research on a next-generation communications system after 4G is to increase an operating band supported by the system to at least 6 GHz, up to about 100 GHz. A high band includes plenty of free frequency resources, and can provide a higher throughput for data transmission. Because a wavelength of a high frequency signal is short, in comparison with a low band, more antenna array elements can be arranged on a panel of a same size, and beams with higher directivity and narrower lobes are formed by using a beamforming technology. Therefore, it is predictable that in the future 5G mobile communications system, the massive MIMO technology with more antenna ports (that is, Massive MIMO technology) is to be introduced. The use of massive antenna arrays can greatly improve system band utilization and support a larger number of access users.

In the massive MIMO technology, if an all-digital array is used, a maximum spatial resolution and optimal MU-MIMO performance may be achieved, but this structure requires a large number of AD/DA conversion devices and a large number of complete radio frequency-baseband processing channels, such that equipment cost and baseband processing complexity will both be a huge burden.

In order to reduce the implementation costs and processing complexity, the digital-analog hybrid beamforming technology has emerged, which, on the basis of conventional digital domain beamforming, performs additional beamforming on radio frequency signals near a front end of an antenna system. With analog beamforming, transmit signals and channels can be roughly matched in a relatively simple manner. The number of dimensions of the equivalent channel formed after the analog shaping is smaller than the actual number of antennas, so the required AD/DA conversion devices, the number of digital channels, and the corresponding baseband processing complexity can all be greatly reduced. The residual interference of the analog shaped portion may be processed again in the digital domain to ensure the quality of MU-MIMO transmission. Compared with all-digital beamforming, digital-analog hybrid beamforming is a compromise scheme in terms of performance and complexity, and has a promising prospect in a high-frequency or large-bandwidth system or a system with a large number of antennas.

Analog beamforming is based on full-bandwidth transmission, and an antenna element in each polarization direction on a panel of each high-frequency antenna array can transmit analog beams only in a time-division multiplexing manner. A beamforming weight of the analog beam is implemented by adjusting parameters of devices such as a phase shifter on the radio frequency front-end. At present, training of analog beamforming vectors is usually performed in a polling mode. To be specific, the antenna element in each polarization direction on each antenna panel transmits a training signal (that is, a candidate beamforming vector) sequentially at appointed time in a time-division multiplexing manner. A terminal feeds back a beam report after measurement, so that the network side can use the training signal to implement analog beam transmission during next service transmission.

In beam measurement and selection, a commonly used parameter for measuring beam quality is a layer 1 reference signal received power (L1-RSRP). In order to further improve accuracy of the beam measurement and selection, especially for beam measurement and selection in multi-cell, multi-user, and multi-beam scenarios, a new parameter L1-SINR is introduced. However, during measurement of an L1-SINR of a beam, no corresponding solutions have been proposed for how to configure CMRs and IMRs, for example, how to configure an association relationship between the CMRs and the IMRs, which will affect beam measurement accuracy and communication reliability of a communications system.

Figure 2:
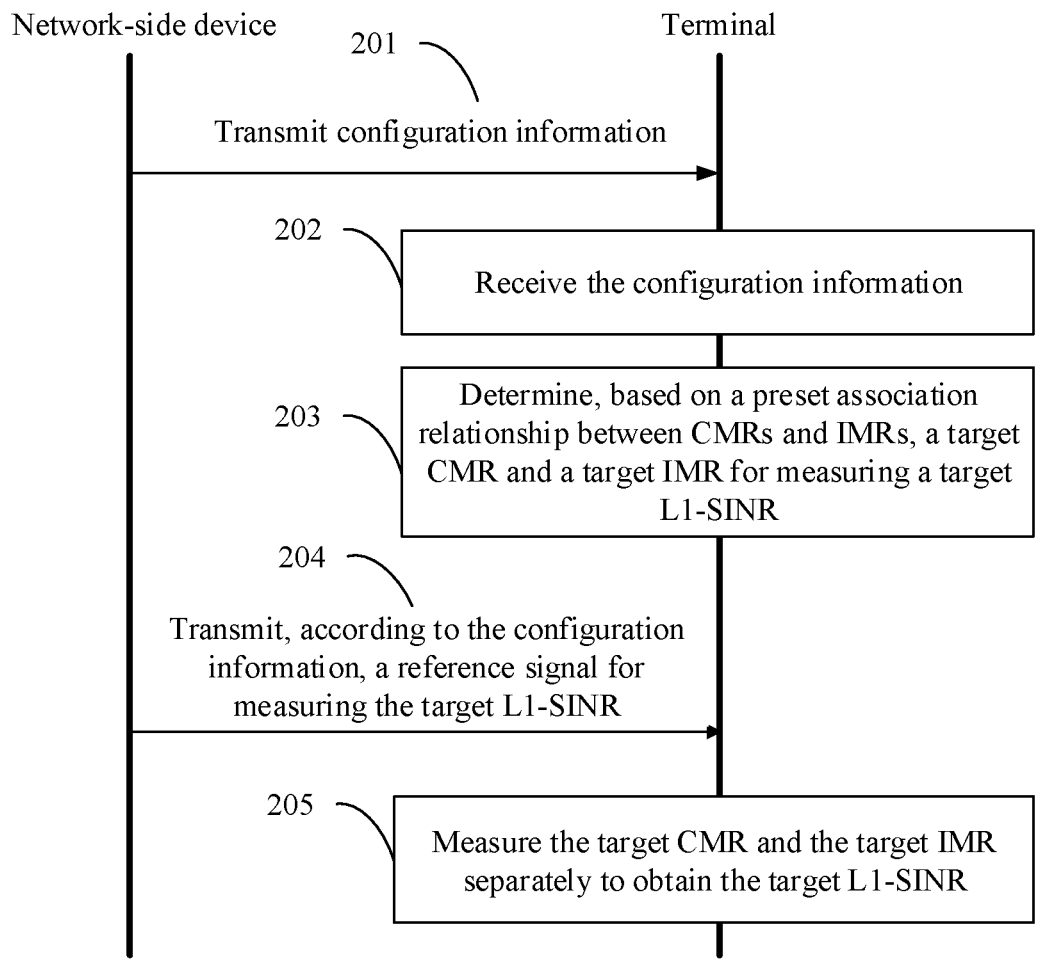
FIG. 2 is a flowchart of a resource configuration and measurement method for L1-SINR measurement applied to the network system shown in FIG. 1 according to an embodiment of this disclosure.

In view of this, the embodiments of this disclosure provide a network system shown in FIG. 1 and provide a resource configuration and measurement method for measuring an L1-SINR applied to the network system. As shown in FIG. 2, the method includes the following steps.

Step 201: A network-side device transmits configuration information to a terminal.

The configuration information is used to at least indicate measuring a layer 1 signal to interference plus noise ratio L1-SINR, the configuration information further includes channel measurement resource CMR information and interference measurement resource IMR information, and there is a preset association relationship between CMRs in the CMR information and IMRs in the IMR information.

Step 202: The terminal receives the configuration information transmitted by the network-side device.

Step 203: The terminal determines, based on the preset association relationship, a target CMR and a target IMR for measuring a target L1-SINR.

Step 204: The network-side device transmits, according to the configuration information, a reference signal for measuring a target L1-SINR.

Step 205: Measure the target CMR and the target IMR separately to obtain the target L1-SINR.

It should be noted that an execution order of the foregoing step 203 and step 204 is not limited. Step 203 may be performed before step 204, or step 204 may be performed before step 202 and step 203, or step 203 and step 204 may be performed at the same time.

In this embodiment of this disclosure, the association relationship between the CMRs and the IMRs for measuring an L1-SINR is preset, so that the terminal can select correct CMRs and IMRs according to the association relationship between the CMRs and the IMRs for channel measurement and interference measurement during measurement of the L1-SINR, thereby improving communication reliability of a communications system.

Figure 3:
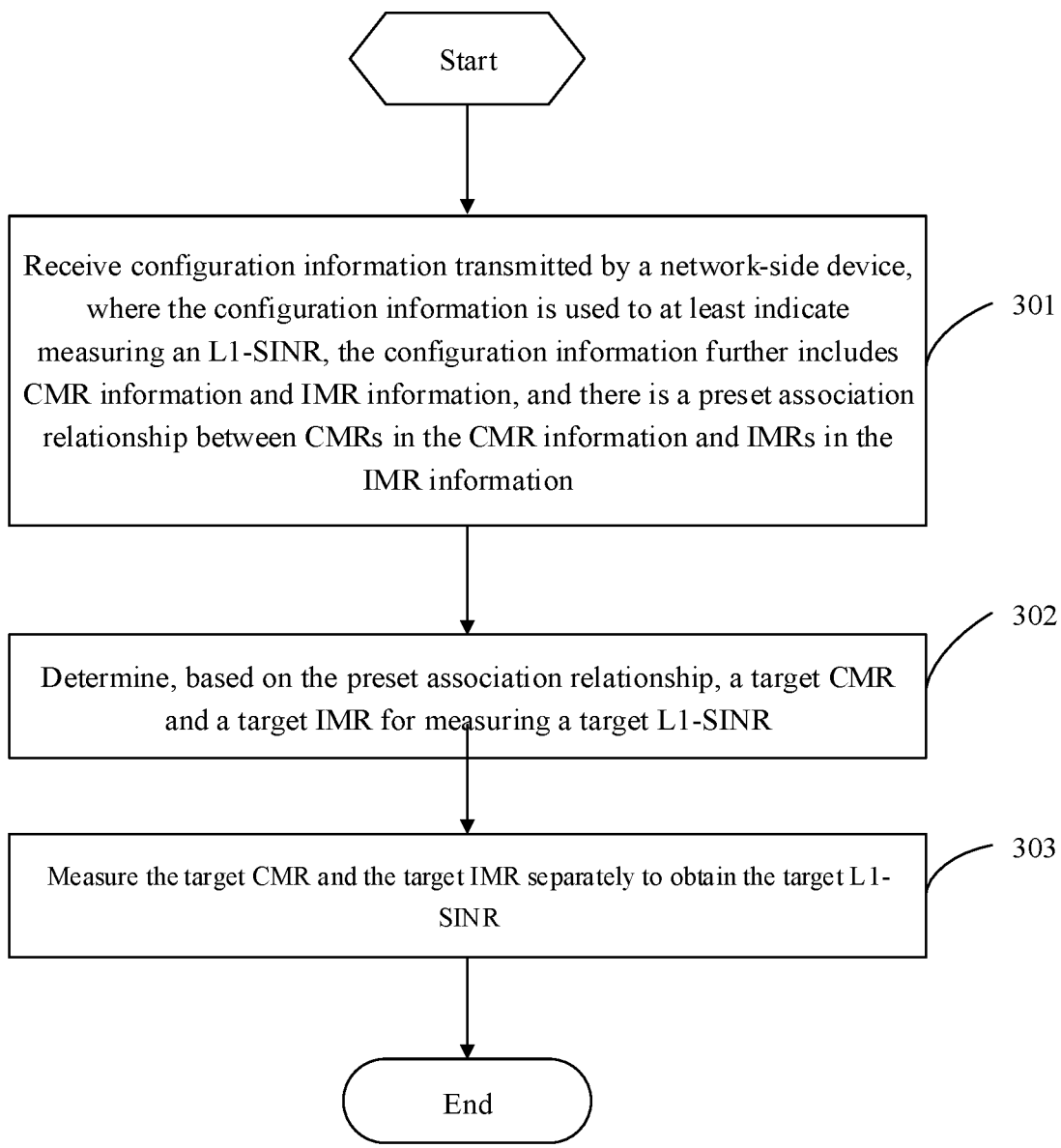
FIG. 3 is a flowchart of a measurement method applied to a terminal according to an embodiment of this disclosure.

FIG. 3 is a flowchart of a measurement method according to an embodiment of this disclosure. As shown in FIG. 3, the measurement method is applied to a terminal, and the method includes the following steps.

Step 301: Receive configuration information transmitted by a network-side device, where the configuration information is used to at least indicate measuring an L1-SINR, the configuration information further includes CMR information and IMR information, and there is a preset association relationship between CMRs in the CMR information and IMRs in the IMR information.

The configuration information may include channel state information (CSI) report setting information. The CSI report setting may include a measurement report parameter. In addition to the L1-SINR, the measurement report parameter may further include an L1-RSRP. In other words, the configuration information may be used to indicate measuring the L1-SINR, and may also be used to indicate measuring the L1-SINR and the L1-RSRP.

The configuration information may be radio resource control (RRC) signaling. That the configuration information includes the CMR information can be understood as that the configuration information may include at least one RS resource setting (reference signal resource setting) used for channel measurement (CM). That the configuration information includes the IMR information can be understood as that the configuration information may include at least one RS resource setting used for interference measurement (IM). Each RS resource setting may include at least one RS resource set (reference signal resource set), and each RS resource set may include at least one RS resource. In this embodiment of this disclosure, when performing configuration for measuring an L1-SINR of a beam, the network-side device can flexibly configure a plurality of CMR resource settings and IMR resource settings.

In this embodiment of this disclosure, the preset association relationship between the CMRs and the IMRs may also include a plurality of association relationships. For example, the association relationship between the CMRs and the IMRs may be an N-to-N association or a one-to-one association, or may be an N-to-one association or a one-to-N association, or even non-association, and so on. The preset association relationship can be preset flexibly, so that flexibility of L1-SINR measurement can be improved.

The preset association relationship may be configured by the network-side device, for example, configured in the configuration information, or may be specified by a protocol.

Step 302: Determine, based on the preset association relationship, a target CMR and a target IMR for measuring a target L1-SINR.

In this step, after receiving the configuration information transmitted by the network-side device, the terminal may select, based on the preset association relationship between the CMRs and the IMRs, a correct target CMR and target IMR for measuring the target L1-SINR. The target CMR is at least one CMR in the CMR information, and the target IMR is at least one IMR in the IMR information.

Step 303: Measure the target CMR and the target IMR separately to obtain the target L1-SINR.

In this step, the terminal can obtain a target channel measurement result by measuring the target CMR, and the terminal can obtain a target interference measurement result by measuring the target IMR. Then the target L1-SINR is calculated by using the target channel measurement result as the numerator and the target interference measurement result as the denominator.

In this embodiment of this disclosure, the association relationship between the CMRs and the IMRs for measuring an L1-SINR is preset, so that the terminal can select correct CMRs and IMRs according to the association relationship between the CMRs and the IMRs for channel measurement and interference measurement during measurement of the L1-SINR, thereby improving communication reliability of a communications system.

In this embodiment of this disclosure, the CMRs in the CMR information and the IMRs in the IMR information may belong to different resource settings or belong to different resource sets in the same resource setting.

If the network-side device has configured a plurality of CMRs, meaning that the CMR information includes a plurality of CMRs, different CMRs in the CMR information belong to different resource settings; or different CMRs in the CMR information belong to the same resource set in the same resource setting; or different CMRs in the CMR information belong to different resource sets in the same resource setting.

Correspondingly, if the network-side device has configured a plurality of IMRs, meaning that the IMR information includes a plurality of IMRs, different IMRs in the IMR information belong to different resource settings; or different IMRs in the IMR information belong to the same resource set in the same resource setting; or different IMRs in the IMR information belong to different resource sets in the same resource setting.

In this embodiment of this disclosure, the CMRs in the CMR information may be periodic CMRs (Periodic-CMR, P-CMR), semi-persistent CMRs (Semi-Persistent-CMR, SP-CMR), or aperiodic CMRs (Aperiodic-CMR, AP-CMR), and the IMRs in the IMR information may also be periodic IMRs (P-IMR), semi-persistent IMRs (SP-IMR), or aperiodic IMRs (AP-IMR). When configuring information about the P-CMRs, SP-CMRs, or AP-CMRs and the P-IMRs, SP-IMRs, or AP-IMRs, the network-side device may configure an association relationship between transmission occasions of the CMRs and the IMRs.

Optionally, the determining, based on the preset association relationship, a target CMR and a target IMR for measuring a target L1-SINR includes:

determining, based on the preset association relationship, a second resource associated with a first resource, where one of the first resource and the second resource is the target CMR, and the other is the target IMR.

In this embodiment, the target CMR for channel measurement and the target IMR for interference measurement are a CMR and an IMR that are associated. For example, CMR1 is associated with IMR1. If the terminal performs channel measurement on CMR1, the terminal performs interference measurement on IMR1, or if the terminal performs interference measurement on IMR1, the terminal performs channel measurement on CMR1.

Optionally, the determining, based on the preset association relationship, a target CMR and a target IMR for measuring a target L1-SINR includes:

determining, based on the preset association relationship, a third resource other than a second resource associated with a first resource, where one of the first resource and the third resource is the target CMR, and the other is the target IMR.

In this embodiment, the target CMR for channel measurement and the target IMR for interference measurement are a CMR and an IMR that are not associated. For example, CMR1 is associated with IMR1, and CMR1 is not associated with IMR2. If the terminal performs channel measurement on CMR1, the terminal performs interference measurement on IMR2, or if the terminal performs interference measurement on IMR2, the terminal performs channel measurement on CMR1.

It should be noted that, in this embodiment of this disclosure, during measurement of an L1-SINR, the terminal may first determine the target CMR for channel measurement, and then determine the target IMR for interference measurement based on the preset association relationship; or the terminal may first determine the target IMR for interference measurement, and then determine the target CMR for channel measurement based on the preset association relationship.

Optionally, the performing interference measurement on the target IMR includes:

measuring the target IMR by using quasi co-location (QCL) information of the target CMR.

In this embodiment, during measurement of an L1-SINR (that is, a target L1-SINR) of a beam, a used IMR (that is, a target IMR) may be QCL information of a CMR (that is, a target CMR) corresponding to the L1-SINR. In this way, a measurement direction for measuring the target CMR by using the QCL information of the target CMR may be consistent with a measurement direction for measuring the target IMR by using the QCL information of the target CMR, so that the accuracy of the measurement can be improved.

In this embodiment of this disclosure, the IMRs in the IMR information may include at least one of zero power (ZP) IMRs or non-zero power (NZP) IMRs. For different types of IMRs, an association relationship between the CMRs and the ZP IMRs and/or the NZP IMRs can be preset flexibly. For example, the network-side device can flexibly configure the association relationship between the CMRs and the ZP IMRs and/or the NZP IMRs.

The following describes the association relationship between the CMRs and the ZP IMRs and/or NZP IMRs one by one. For better understanding of the manner of measuring an L1-SINR by the terminal under each association relationship, the following descriptions is given based on a manner in which the terminal first determines the CMRs for channel measurement, and then determines the IMRs for interference measurement based on the preset association relationship.

Manner 1: The IMRs in the IMR information include ZP IMRs, and the preset association relationship includes one of the following:

the association relationship between the CMRs and the ZP IMRs is N-to-N association;
the association relationship between the CMRs and the ZP IMRs is one-to-one association;
N CMRs are associated with one ZP IMR; and
one CMR is associated with N ZP IMRs.

This manner provides four configuration manners of the association relationship between the CMRs and the ZP IMRs, which are specifically as follows.

1: The association relationship between the CMRs and the ZP IMRs is N-to-N association, which can be understood as an N CMRs-to-N ZP IMRs association or N one-to-one associations, where N is a positive integer greater than 1.

In this preset association relationship, N CMRs in a CMR resource set and N ZP IMRs in a ZP IMR resource set may have an association relationship. Specifically, the N CMRs in the CMR resource set in ascending order of resource indexes are sequentially associated with the N ZP IMRs in the ZP IMR resource set in ascending order of resource indexes, that is, CMR1 in the CMR resource set is associated with ZP IMR1 in the ZP IMR resource set, CMR2 in the CMR resource set is associated with ZP IMR2 in the ZP IMR resource set, and so on.

Alternatively, N CMRs in the CMR resource setting determined according to an index order of CMR resource sets and an index order of resources in each resource set may be sequentially associated with N ZP IMRs in the ZP IMR resource setting determined according to an index order of ZP IMR resource sets and an index order of resources in each resource set. For example, CMR1 in the first resource set of the CMR resource setting is associated with ZP IMR1 in the first resource set of the ZP IMR resource setting, CMR2 in the first resource set of the CMR resource setting is associated with ZP IMR2 in the first resource set of the ZP IMR resource setting, CMR1 in the second resource set of the CMR resource setting is associated with ZP IMR1 in the second resource set of the ZP IMR resource setting, CMR2 in the second resource set of the CMR resource setting is associated with ZP IMR2 in the second resource set of the ZP IMR resource setting, and so on.

Alternatively, N CMRs determined according to an index order of CMR resource settings, an index order of resource sets in each resource setting, and an index order of resources in each resource set are sequentially associated with N ZP IMRs determined according to an index order of ZP IMR resource settings, an index order of resource sets in each resource setting, and an index order of resources in each resource set. For example, CMR1 in the first resource set in the first CMR resource setting is associated with ZP IMR1 in the first resource set in the first ZP IMR resource setting, CMR2 in the first resource set in the first CMR resource setting is associated with ZP IMR2 in the first resource set in the first ZP IMR resource setting, CMR1 in the second resource set in the first CMR resource setting is associated with ZP IMR1 in the second resource set in the first ZP IMR resource setting, CMR2 in the second resource set in the first CMR resource setting is associated with ZP IMR2 in the second resource set in the first ZP IMR resource setting, CMR1 in the first resource set in the second CMR resource setting is associated with ZP IMR1 in the first resource set in the second ZP IMR resource setting, CMR2 in the first resource set in the second CMR resource setting is associated with ZP IMR2 in the first resource set in the second ZP IMR resource setting, CMR1 in the second resource set in the second CMR resource setting is associated with ZP IMR1 in the second resource set in the second ZP IMR resource setting, CMR2 in the second resource set in the second CMR resource setting is associated with ZP IMR2 in the second resource set in the second ZP IMR resource setting, and so on.

During measurement of a beam, the terminal may perform channel measurement on each beam by using a CMR of the beam itself, and perform interference measurement on each beam by using a ZP IMR associated with the CMR. For example, CMR1 is used for channel measurement of beam1, and ZP IMR1 associated with CMR1 is used for interference measurement of beam1. Herein, QCL information of CMR1 may be used for measuring ZP IMR1.

Further, the CMRs configured by the network-side device are aperiodic CMRs, and the IMRs configured by the network-side device are aperiodic IMRs. Specifically, the network-side device triggers at least one report setting, where the report setting is associated with one aperiodic CMR resource setting and one aperiodic IMR resource setting, and in resource sets of the respective resource settings, the aperiodic CMRs and the aperiodic IMRs are in an N-to-N association.

2. The association relationship between the CMRs and the ZP IMRs is one-to-one association.

The network-side device may configure one report setting, which is associated with one CMR resource setting and one ZP IMR resource setting, where the CMRs and the ZP IMRs are in a one-to-one association. Specifically, the associated CMRs and ZP IMRs may be determined according to at least one of an index order of resource settings, an index order of resource sets in each resource setting, or an index order of resources in each resource set. For example, if the CMR resource setting includes one resource set and the ZP IMR resource setting includes one resource set, the first CMR in the resource set of the CMR resource setting is associated with the first ZP IMR in the resource set of the ZP IMR resource setting. Alternatively, if the CMR resource setting includes M resource sets, each resource set including one CMR, and the ZP IMR resource setting includes M resource sets, each resource set including one ZP IMR, CMRs in the first resource set of the CMR resource setting are associated with ZP IMRs in the first resource set of the ZP IMR resource setting. Other one-to-one association manners between the CMRs and the ZP IMRs also fall within the protection scope of this disclosure, and will not be described herein.

3. N CMRs are associated with one ZP IMR, where N is a positive integer greater than 1.

The network-side device may configure one report setting, which is associated with N CMR resource settings and one ZP IMR resource setting, or associated with one CMR resource setting including N resource sets and one ZP IMR resource setting including one resource set, where CMRs and ZP IMRs are in an N-to-one association, and N CMRs may come from the same resource setting or different resource settings, or may come from the same resource set or different resource sets.

For example, if the CMR resource setting includes N resource sets and the ZP IMR resource setting includes one resource set, the first CMRs (N in total) in all resource sets of the CMR resource setting are associated with the first ZP IMR in the resource set of the ZP IMR resource setting. Alternatively, if the CMR resource setting includes M resource sets, each resource set including N CMRs, and the ZP IMR resource setting includes M resource sets, each resource set including one ZP IMR, N CMRs in the first resource set of the CMR resource setting are associated with one ZP IMR in the first resource set of the ZP IMR resource setting. Alternatively, if the CMR resource setting includes one resource set, the resource set in the CMR resource setting includes N CMRs, and the ZP IMR resource setting includes one resource set, the N CMRs in the resource set of the CMR resource setting are associated with the first ZP IMR in the resource set of the ZP IMR resource setting. Alternatively, if there are N CMR resource settings, each resource setting including one resource set, and there is one ZP IMR resource setting, each resource setting including one resource set, the first CMRs (N in total) in the resource sets of all CMR resource settings are associated with the first ZP IMR in the resource set of the ZP IMR resource setting. Other N-to-one association manners between the CMRs and the ZP IMRs also fall within the protection scope of this disclosure, and will not be described herein.

During beam measurement, the terminal performs channel measurement on each beam by using a CMR of the beam, and performs interference measurement on each beam by using a ZP IMR associated with the CMR, where the ZP IMRs associated with the CMRs are the same or the resources overlap.

Further, the ZP IMRs configured by the network-side device are periodic ZP resources or semi-persistent ZP resources, and the CMRs configured by the network-side device may be periodic CMRs or semi-persistent CMRs or aperiodic CMRs.

Further, when configuring information about the P-CMRs, SP-CMRs, or AP-CMRs and the P-IMRs or SP-IMRs, the network-side device may configure an association relationship between transmission occasions of the CMRs and the IMRs.

4. One CMR is associated with N ZP IMRs, where N is a positive integer greater than 1.

The network-side device may configure one report setting, which is associated with one CMR resource setting and N ZP IMR resource settings, or associated with one CMR resource setting including one resource set and one ZP IMR resource setting including N resource sets, where CMRs and ZP IMRs are in a one-to-N association, N ZP IMRs may come from the same resource setting or different resource settings (for example, the report setting is associated with N ZP IMR resource settings and one CMR resource setting), or may come from the same resource set or different resource sets.

For example, if the CMR resource setting includes one resource set and the ZP IMR resource setting includes N resource sets, the first CMR in the resource set of the CMR resource setting is associated with the first ZP IMRs (N in total) in all resource sets of the ZP IMR resource setting. Alternatively, if the CMR resource setting includes M resource sets, each resource set including one CMR, and the ZP IMR resource setting includes M resource sets, each resource set including N ZP IMRs, CMRs in the first resource set of the CMR resource setting are associated with N ZP IMRs in the first resource set of the ZP IMR resource setting. Alternatively, if the CMR resource setting includes one resource set, the ZP IMR resource setting includes one resource set, and the resource set in the ZP IMR resource setting includes N ZP IMRs, the first CMR in the resource set of the CMR resource setting is associated with the N ZP IMRs in the resource set of the ZP IMR resource setting. Alternatively, if there is one CMR resource setting, each resource setting including one resource set, and there are N ZP IMR resource settings, each resource setting including one resource set, the first CMR in the resource set of the CMR resource setting is associated with the first ZP IMRs (N in total) in the resource sets of all ZP IMR resource settings. Other one-to-N association manners between the CMRs and the ZP IMRs also fall within the protection scope of this disclosure, and will not be described herein.

Manner 2: The IMRs in the IMR information include NZP IMRs, and the preset association relationship includes one of the following:

N CMRs are associated with one NZP IMR;

N NZP IMRs are associated with one CMR;

the association relationship between the CMRs and the NZP IMRs is one-to-one association; and the CMRs are not associated with the NZP IMRs.

The NZP IMRs may be NZP CSI reference signals (CSI-RS), or tracking reference signals (TRS).

1. N CMRs are associated with one NZP IMR, where N is an integer greater than 1.

The network-side device may configure one report setting, which is associated with N CMR resource settings and one NZP IMR resource setting, or associated with one CMR resource setting including N resource sets and one NZP IMR resource setting including one resource set, where CMRs and NZP IMRs are in an N-to-one association, and N CMRs may come from the same resource setting or different resource settings, or may come from the same resource set or different resource sets.

For example, if the CMR resource setting includes N resource sets and the NZP IMR resource setting includes one resource set, the first CMRs (N in total) in all resource sets of the CMR resource setting are associated with the first NZP IMR in the resource set of the NZP IMR resource setting. Alternatively, if the CMR resource setting includes M resource sets, each resource set including N CMRs, and the NZP IMR resource setting includes M resource sets, each resource set including one NZP IMR, N CMRs in the first resource set of the CMR resource setting are associated with one NZP IMR in the first resource set of the NZP IMR resource setting. Alternatively, if the CMR resource setting includes one resource set, the resource set in the CMR resource setting includes N CMRs, and the NZP IMR resource setting includes one resource set, the N CMRs in the resource set of the CMR resource setting are associated with the first NZP IMR in the resource set of the NZP IMR resource setting. Alternatively, if there are N CMR resource settings, each resource setting including one resource set, and there is one NZP IMR resource setting, each resource setting including one resource set, the first CMRs (N in total) in the resource sets of all CMR resource settings are associated with the first NZP IMR in the resource set of the NZP IMR resource setting. Other N-to-one association manners between the CMRs and the NZP IMRs also fall within the protection scope of this disclosure, and will not be described herein. For aperiodic reports, the network-side device may trigger one or more report settings as described above.

During beam measurement, if the terminal performs channel measurement on beam1, beam2, and beam3 by using their respective CMRs, that is, using CMR1, CMR2, and CMR3 respectively, and measures interference of beam4 to beam1, beam2, and beam3 by using NZP IMR4, CMR1, CMR2, and CMR3 are associated with NZP IMR4. When interference measurement is performed on beam1, beam2, and beam3 by using NZP IMR4, QCL information of CMR1, CMR2, and CMR3 is separately used for measuring NZP IMR4.

2. N NZP IMRs are associated with one CMR where N is an integer greater than 1.

The network-side device may configure one report setting, which is associated with one CMR resource setting and N NZP IMR resource settings, or associated with one CMR resource setting including one resource set and one NZP IMR resource setting including N resource sets, where CMRs and NZP IMRs are in a one-to-N association, and N NZP IMRs may come from the same resource setting or different resource settings, or may come from the same resource set or different resource sets.

For example, if the CMR resource setting includes one resource set and the NZP IMR resource setting includes N resource sets, the first CMR in the resource set of the CMR resource setting is associated with the first NZP IMRs (N in total) in all resource sets of the NZP IMR resource setting. Alternatively, if the CMR resource setting includes M resource sets, each resource set including one CMR, and the NZP IMR resource setting includes M resource sets, each resource set including N NZP IMRs, CMRs in the first resource set of the CMR resource setting are associated with N NZP IMRs in the first resource set of the NZP IMR resource setting. Alternatively, if the CMR resource setting includes one resource set, the NZP IMR resource setting includes one resource set, and the resource set in the NZP IMR resource setting includes N NZP IMR, the first CMR in the resource set of the CMR resource setting is associated with the N NZP IMRs in the resource set of the NZP IMR resource setting. Alternatively, if there is one CMR resource setting, the resource setting including one resource set, and there are N NZP IMR resource settings, each resource setting including one resource set, the first CMR in the resource set of the CMR resource setting is associated with the first NZP IMRs (N in total) in the resource sets of all NZP IMR resource settings. Other one-to-N association manners between the CMRs and the NZP IMRs also fall within the protection scope of this disclosure, and will not be described herein.

For aperiodic reports, the network-side device may trigger one or more report settings as described above.

During beam measurement, the terminal performs channel measurement on beam1 by using CMR1, and performs interference measurement on beam1 by using NZP IMR2, NZP IMR3, and NZP IMR4, to measure interference of beam2, beam3, and beam4 to beam1, meaning that CMR1 is associated with NZP IMR2, NZP IMR3, and NZP IMR4. In the case of measuring NZP IMR2, NZP IMR3, and NZP IMR4, QCL information of CMR1 is used.

Further, NZP IMR may not be configured, but CMR1 is used for performing channel measurement on beam1, and CMR2, CMR3, and CMR4 are used for performing interference measurement on beam1, to measure interference of beam2, beam3, and beam4 to beam1. In the case of measuring CMR2, CMR3, and CMR4, QCL information of CMR1 is used.

3. The association relationship between the CMRs and the NZP IMRs is one-to-one association, or the CMRs are not associated with the NZP IMRs.

The network-side device may configure one report setting, which is associated with one CMR resource setting and one NZP IMR resource setting, where the CMRs and the NZP IMRs are in a one-to-one association. Specifically, the associated CMRs and NZP IMRs may be determined according to at least one of an index order of resource settings, an index order of resource sets in each resource setting, or an index order of resources in each resource set.

For example, if the CMR resource setting includes one resource set and the NZP IMR resource setting includes one resource set, the first CMR in the resource set of the CMR resource setting is associated with the first NZP IMR in the resource set of the NZP IMR resource setting. Alternatively, if the CMR resource setting includes M resource sets, each resource set including one CMR, and the NZP IMR resource setting includes M resource sets, each resource set including one NZP IMR, CMRs in the first resource set of the CMR resource setting are associated with NZP IMRs in the first resource set of the NZP IMR resource setting. Other one-to-one association manners between the CMRs and the NZP IMRs also fall within the protection scope of this disclosure, and will not be described herein. In the foregoing example, it may also be allowed that there is an NZP IMR not associated with CMRs in the resource sets of the NZP IMR resource setting, or that there is a CMR not associated with NZP IMRs in the resource sets of the CMR resource setting.

When the terminal performs beam measurement, for example, on four beams in total, a network may configure that the resource set in the CMR resource setting includes CMR1, CMR2, CMR3, and CMR4, which are used for channel measurement of the beams respectively. One NZP IMR resource setting may also be configured, where NZP IMR1 and NZP IMR2 correspond to beam1 and beam2 respectively, NZP IMR1 is used for measuring interference of beam1 to beam2, beam3, and beam4, and NZP IMR2 is used for measuring interference of beam2 to beam1, beam3, and beam4. CMR1 is associated with NZP IMR1, CMR2 is associated with NZP IMR2, and CMR3 and CMR4 are not associated with NZP IMRs.

In the case of measuring an L1-SINR of beam1, measurement of interference of beam2 can exclude interference that is measured by using an IMR whose resource id corresponds to a resource id of a CMR corresponding to beam1, meaning that interference measurement is performed on another NZP IMR (namely NZP IMR2) other than NZP IMR1 associated with CMR1, to obtain an interference measurement result of beam2 to beam1, where QCL information of CMR1 is used when NZP IMR2 is measured. In the case of measuring interference of beam3 and beam4, CMR3 and CMR4 may be used for interference measurement, and in the case of measuring NZP IMR3 and NZP IMR4, QCL information of CMR1 may be used. Alternatively, there is no need to measure interference of beam3 and beam4.

In the case of measuring an L1-SINR of beam3, CMR3 is used for channel measurement, NZP IMR1, NZP IMR2, and CMR4 are used for measuring interference of beam1, beam2, and beam4 respectively, and QCL information of CMR3 is used when NZP IMR1, NZP IMR2, and CMR4 are measured. Alternatively, there is no need to measure interference of beam4.

Manner 3: The IMRs in the IMR information include ZP IMRs and NZP IMRs,
and the preset association relationship includes:
the association relationship among the CMRs, the ZP IMRs, and the NZP IMRs is one-to-M-to-N, where M and N are positive integers.

The network-side device may configure one report setting, which is associated with one CMR resource setting, at least one ZP IMR resource setting, and at least one NZP IMR resource setting, where resources in the three resource settings are in a one-to-M-to-N association. The network-side device may trigger a plurality of such report settings.

The association relationship among the CMRs, the ZP IMRs, and the NZP IMRs may be one-to-M-to-N, meaning that M is equal to 1.

For example, if M is equal to 1, that is, the CMR resource setting includes one resource set, the ZP IMR resource setting includes one resource set, and the NZP IMR resource setting includes N resource sets, then the first CMR in the resource set of the CMR resource setting, the first ZP IMR in the resource set of the ZP IMR resource setting, and the first NZP IMRs (N in total) in all resource sets of the NZP IMR resource setting are associated, and so on. Alternatively, if there are one CMR resource setting, one ZP IMR resource setting, and N NZP IMR resource settings, and each of the foregoing resource settings includes one resource set, the first CMR in the resource set of the CMR resource setting, the first ZP IMR in the resource set of the ZP IMR resource setting, and the first NZP IMRs (N in total) in the resource sets of all NZP IMR resource settings are associated, and so on.

Other one-to-one-to-N association manners among the CMRs, the ZP IMRs, and the NZP IMRs also fall within the protection scope of this disclosure, and will not be described herein.

For another example, if the CMR resource setting includes one resource set, the ZP IMR resource setting includes M resource sets, and the NZP IMR resource setting includes N resource sets, the first CMR in the resource set of the CMR resource setting, the first ZP IMRs (M in total) in all resource sets of the ZP IMR resource setting, and the first NZP IMRs (N in total) in all resource sets of the NZP IMR resource setting are associated, and so on. Alternatively, if there are one CMR resource setting, M ZP IMR resource settings, and N NZP IMR resource settings, and each of the foregoing resource settings includes one resource set, the first CMR in the resource set of the CMR resource setting, the first ZP IMRs (M in total) in the resource sets of all ZP IMR resource settings, and the first NZP IMRs (N in total) in the resource sets of all NZP IMR resource settings are associated, and so on.

Other one-to-M-to-N association manners among the CMRs, the ZP IMRs, and the NZP IMRs also fall within the protection scope of this disclosure, and will not be described herein.

When the terminal measures an L1-SINR of beam1, the cumulative interference needs to be measured by using ZP IMRs and NZP IMRs. However, if an IMR associated with a CMR corresponding to beam1 is used for interference measurement for another beam, interference measurement on beam1 needs to exclude the interference measured by using the IMR whose resource id corresponds to a resource id of the CMR corresponding to beam1, that is, interference measurement is performed by using an IMR other than the IMR associated with the CMR corresponding to beam1, where QCL information of the CMR corresponding to beam1 may be used when the IMR other than the IMR associated with the CMR corresponding to beam1 is measured.

The ZP IMRs may be used for inter-cell interference measurement, and the NZP IMRs may be used for inter-beam interference measurement.

In addition, in addition to the foregoing one-to-M-to-N association relationship, the CMRs, ZP IMRs, and NZP IMRs may also have various other possible relationships. The network-side device may configure one report setting, which is associated with at least one CMR resource setting, at least one ZP IMR resource setting, and at least one NZP IMR resource setting, CMRs, ZP IMRs, and NZP IMRs in the foregoing three resource settings may have other association relationships.

In the foregoing embodiments, the association relationship between the CMRs and the IMRs for measuring an L1-SINR is flexibly configured or specified by a protocol, so that the terminal can select correct CMRs and IMRs according to the association relationship between the CMRs and the IMRs for channel measurement and interference measurement during measurement of the L1-SINR, thereby improving accuracy of L1-SINR measurement and improving communication reliability of a communications system.

Figure 4:
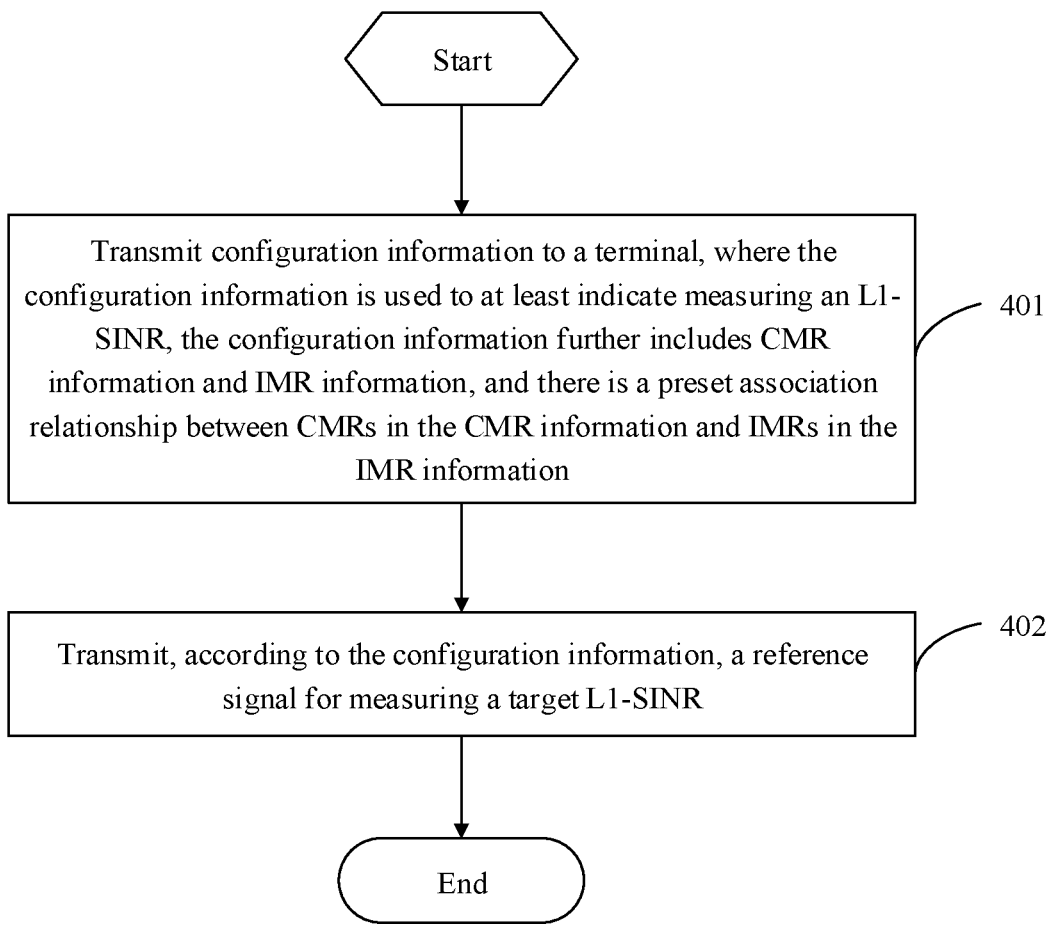
FIG. 4 is a flowchart of a resource configuration method applied to a network-side device according to an embodiment of this disclosure.

FIG. 4 is a flowchart of a measurement method according to an embodiment of this disclosure. As shown in FIG. 4, the measurement method is applied to a network-side device and includes the following steps.

Step 401: Transmit configuration information to a terminal, where the configuration information is used to at least indicate measuring a layer 1 signal to interference plus noise ratio L1-SINR, the configuration information further includes channel measurement resource CMR information and interference measurement resource IMR information, and there is a preset association relationship between CMRs in the CMR information and IMRs in the IMR information.

Step 402: Transmit, according to the configuration information, a reference signal for measuring a target L1-SINR.

Optionally, the preset association relationship is configured by the network-side device; or
the preset association relationship is specified by a protocol.

Optionally, the IMRs in the IMR information include at least one of ZP IMRs or NZP IMRs.

Optionally, the IMRs in the IMR information include ZP IMRs,
and the preset association relationship includes one of the following:
the association relationship between the CMRs and the ZP IMRs is N-to-N association;
the association relationship between the CMRs and the ZP IMRs is one-to-one association;
N CMRs are associated with one ZP IMR; and
one CMR is associated with N ZP IMRs; where
N is a positive integer greater than 1.

Optionally, the IMRs in the IMR information include NZP IMRs,
and the preset association relationship includes one of the following:
N CMRs are associated with one NZP IMR;
N non-zero power IMRs are associated with one CMR;
the association relationship between the CMRs and the NZP IMRs is one-to-one association; and
the CMRs are not associated with the NZP IMRs; where
N is a positive integer greater than 1.

Optionally, the IMRs in the IMR information include ZP IMRs and NZP IMRs,
and the preset association relationship includes:
the association relationship among the CMRs, the ZP IMRs, and the NZP IMRs is one-to-M-to-N, where M and N are positive integers.

Optionally, the CMRs in the CMR information are periodic CMRs or semi-persistent CMRs or aperiodic CMRs.

Optionally, the IMRs in the IMR information are periodic IMRs or semi-persistent IMRs or aperiodic IMRs.

Optionally, the configuration information further includes an association relationship between transmission occasions of the CMRs and the IMRs.

Optionally, the configuration information is further used to indicate measuring a layer 1 reference signal received power L1-RSRP.

Optionally, the CMRs in the CMR information and the IMRs in the IMR information belong to different reference signal resource settings resource setting or belong to different resource sets resource set in the same resource setting.

Optionally, different CMRs in the CMR information belong to different resource settings; or
different CMRs in the CMR information belong to the same resource set in the same resource setting; or
different CMRs in the CMR information belong to different resource sets in the same resource setting.

Optionally, different IMRs in the IMR information belong to different resource settings; or
different IMRs in the IMR information belong to the same resource set in the same resource setting; or
different IMRs in the IMR information belong to different resource sets in the same resource setting.

In this embodiment of this disclosure, the association relationship between the CMRs and the IMRs for measuring an L1-SINR is preset, so that the terminal can select correct CMRs and IMRs according to the association relationship between the CMRs and the IMRs for channel measurement and interference measurement during measurement of the L1-SINR, thereby improving communication reliability of a communications system.

It should be noted that for specific implementations of this embodiment of this disclosure as an embodiment of the network-side device corresponding to the embodiment shown in FIG. 3, reference may be made to the relevant descriptions about the embodiment shown in FIG. 3, and the same beneficial effect can be achieved. To avoid repetition, details are not described herein again.

Figure 5:
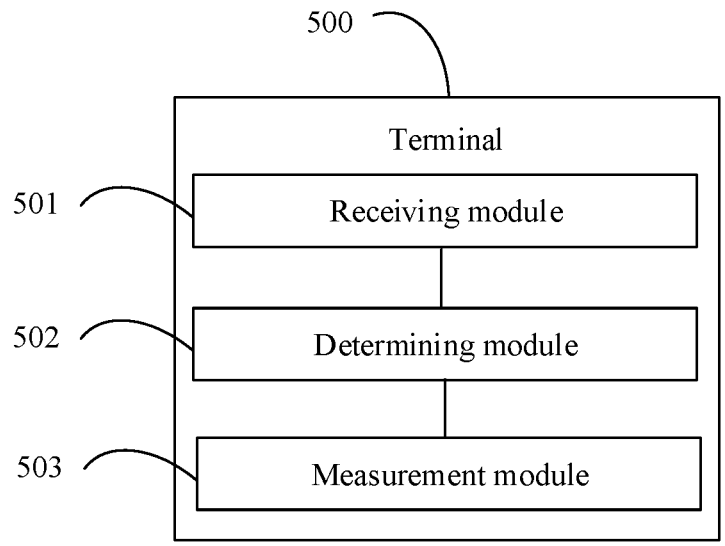
FIG. 5 is a structural diagram of a terminal according to an embodiment of this disclosure.

FIG. 5 is a structural diagram of a terminal according to an embodiment of this disclosure. As shown in FIG. 5, the terminal 500 includes:
a receiving module 501, configured to receive configuration information transmitted by a network-side device, where the configuration information is used to at least indicate measuring a layer 1 signal to interference plus noise ratio L1-SINR, the configuration information further includes channel measurement resource CMR information and interference measurement resource IMR information, and there is a preset association relationship between CMRs in the CMR information and IMRs in the IMR information;
a determining module 502, configured to determine, based on the preset association relationship, a target CMR and a target IMR for measuring a target L1-SINR; and
a measurement module 503, configured to measure the target CMR and the target IMR separately to obtain the target L1-SINR.

Optionally, the preset association relationship is configured by the network-side device; or
the preset association relationship is specified by a protocol.

Optionally, the determining module 502 is specifically configured to:
determine, based on the preset association relationship, a second resource associated with a first resource, where one of the first resource and the second resource is the target CMR, and the other is the target IMR.

Optionally, the determining module 502 is specifically configured to:
determine, based on the preset association relationship, a third resource other than a second resource associated with a first resource, where one of the first resource and the third resource is the target CMR, and the other is the target IMR.

Optionally, the measurement module 503 is specifically configured to:
measure the target IMR by using quasi co-location QCL information of the target CMR.

Optionally, the IMRs in the IMR information include at least one of zero power IMRs or non-zero power IMRs.

Optionally, the IMRs in the IMR information include zero power IMRs,
and the preset association relationship includes one of the following:
the association relationship between the CMRs and the zero power IMRs is N-to-N association;
the association relationship between the CMRs and the zero power IMRs is one-to-one association;
N CMRs are associated with one zero power IMR; and one CMR is associated with N zero power IMRs; where N is a positive integer greater than 1.

Optionally, the IMRs in the IMR information include non-zero power IMRs,
and the preset association relationship includes one of the following:
N CMRs are associated with one non-zero power IMR;
N non-zero power IMRs are associated with one CMR;
the association relationship between the CMRs and the non-zero power IMRs is one-to-one association; and
the CMRs are not associated with the non-zero power IMRs; where
N is a positive integer greater than 1.

Optionally, the IMRs in the IMR information include the zero power IMRs and the non-zero power IMRs,
and the preset association relationship includes:
the association relationship among the CMRs, the zero power IMRs, and the non-zero power IMRs is one-to-M-to-N association, where M and N are positive integers.

Optionally, the CMRs in the CMR information are periodic CMRs or semi-persistent CMRs or aperiodic CMRs.

Optionally, the IMRs in the IMR information are periodic IMRs or semi-persistent IMRs or aperiodic IMRs.

Optionally, the configuration information further includes an association relationship between transmission occasions of the CMRs and the IMRs.

Optionally, the configuration information is further used to indicate measuring a layer 1 reference signal received power L1-RSRP.

Optionally, the CMRs in the CMR information and the IMRs in the IMR information belong to different reference signal resource settings resource setting or belong to different resource sets resource set in the same resource setting.

Optionally, different CMRs in the CMR information belong to different resource settings; or
different CMRs in the CMR information belong to the same resource set in the same resource setting; or
different CMRs in the CMR information belong to different resource sets in the same resource setting.

Optionally, different IMRs in the IMR information belong to different resource settings; or
different IMRs in the IMR information belong to the same resource set in the same resource setting; or different IMRs in the IMR information belong to different resource sets in the same resource setting.

It should be noted that the terminal 500 in this embodiment of this disclosure may be a terminal in any implementation of the method embodiments. Any implementation of the terminal in the method embodiments can be implemented by the terminal 500 in this embodiment of this disclosure, and the same beneficial effect can be achieved. To avoid repetition, details are not described herein again.

Figure 6:
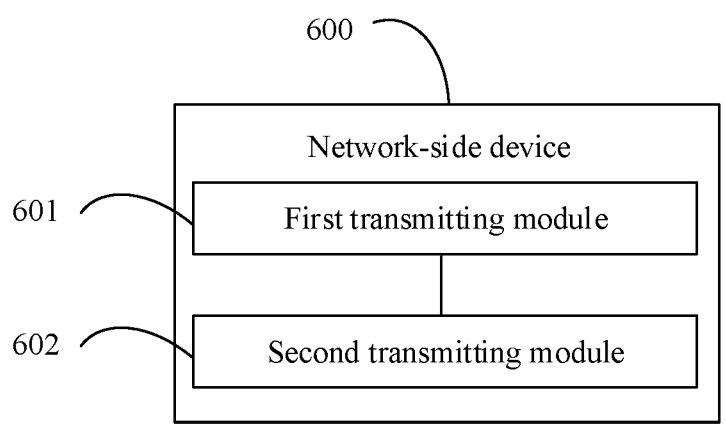
FIG. 6 is a structural diagram of a network-side device according to an embodiment of this disclosure.

FIG. 6 is a structural diagram of a network-side device according to an embodiment of this disclosure. As shown in FIG. 6, the network-side device 600 includes:

a first transmitting module 601, configured to transmit configuration information to a terminal, where the configuration information is used to at least indicate measuring a layer 1 signal to interference plus noise ratio L1-SINR, the configuration information further includes channel measurement resource CMR information and interference measurement resource IMR information, and there is a preset association relationship between CMRs in the CMR information and IMRs in the IMR information; and a second transmitting module 602, configured to transmit, according to the configuration information, a reference signal for measuring a target L1-SINR.

Optionally, the preset association relationship is configured by the network-side device; or the preset association relationship is specified by a protocol.

Optionally, the IMRs in the IMR information include at least one of ZP IMRs or NZP IMRs.

Optionally, the IMRs in the IMR information include ZP IMRs, and the preset association relationship includes one of the following:

the association relationship between the CMRs and the ZP IMRs is N-to-N association;

the association relationship between the CMRs and the ZP IMRs is one-to-one association;

N CMRs are associated with one ZP IMR; and one CMR is associated with N ZP IMRs; where N is a positive integer greater than 1.

Optionally, the IMRs in the IMR information include NZP IMRs, and the preset association relationship includes one of the following:

N CMRs are associated with one NZP IMR;

N NZP IMRs are associated with one CMR;

the association relationship between the CMRs and the NZP IMRs is one-to-one association; and the CMRs are not associated with the NZP IMRs; where N is a positive integer greater than 1.

Optionally, the IMRs in the IMR information include ZP IMRs and NZP IMRs, and the preset association relationship includes:

the association relationship among the CMRs, the ZP IMRs, and the NZP IMRs is one-to-M-to-N, where M and N are positive integers.

Optionally, the CMRs in the CMR information are periodic CMRs or semi-persistent CMRs or aperiodic CMRs.

Optionally, the IMRs in the IMR information are periodic IMRs or semi-persistent IMRs or aperiodic IMRs.

Optionally, the configuration information further includes an association relationship between transmission occasions of the CMRs and the IMRs.

Optionally, the configuration information is further used to indicate measuring a layer 1 reference signal received power L1-RSRP.

Optionally, the CMRs in the CMR information and the IMRs in the IMR information belong to different reference signal resource settings resource setting or belong to different resource sets resource set in the same resource setting.

Optionally, different CMRs in the CMR information belong to different resource settings; or different CMRs in the CMR information belong to the same resource set in the same resource setting; or different CMRs in the CMR information belong to different resource sets in the same resource setting.

Optionally, different IMRs in the IMR information belong to different resource settings; or different IMRs in the IMR information belong to the same resource set in the same resource setting; or different IMRs in the IMR information belong to different resource sets in the same resource setting.

It should be noted that the network-side device 600 in this embodiment of this disclosure may be a network-side device in any implementation of the method embodiments. Any implementation of the network-side device in the method embodiments can be implemented by the network-side device 600 in this embodiment of this disclosure, and the same beneficial effect can be achieved. To avoid repetition, details are not described herein again.

Figure 7:
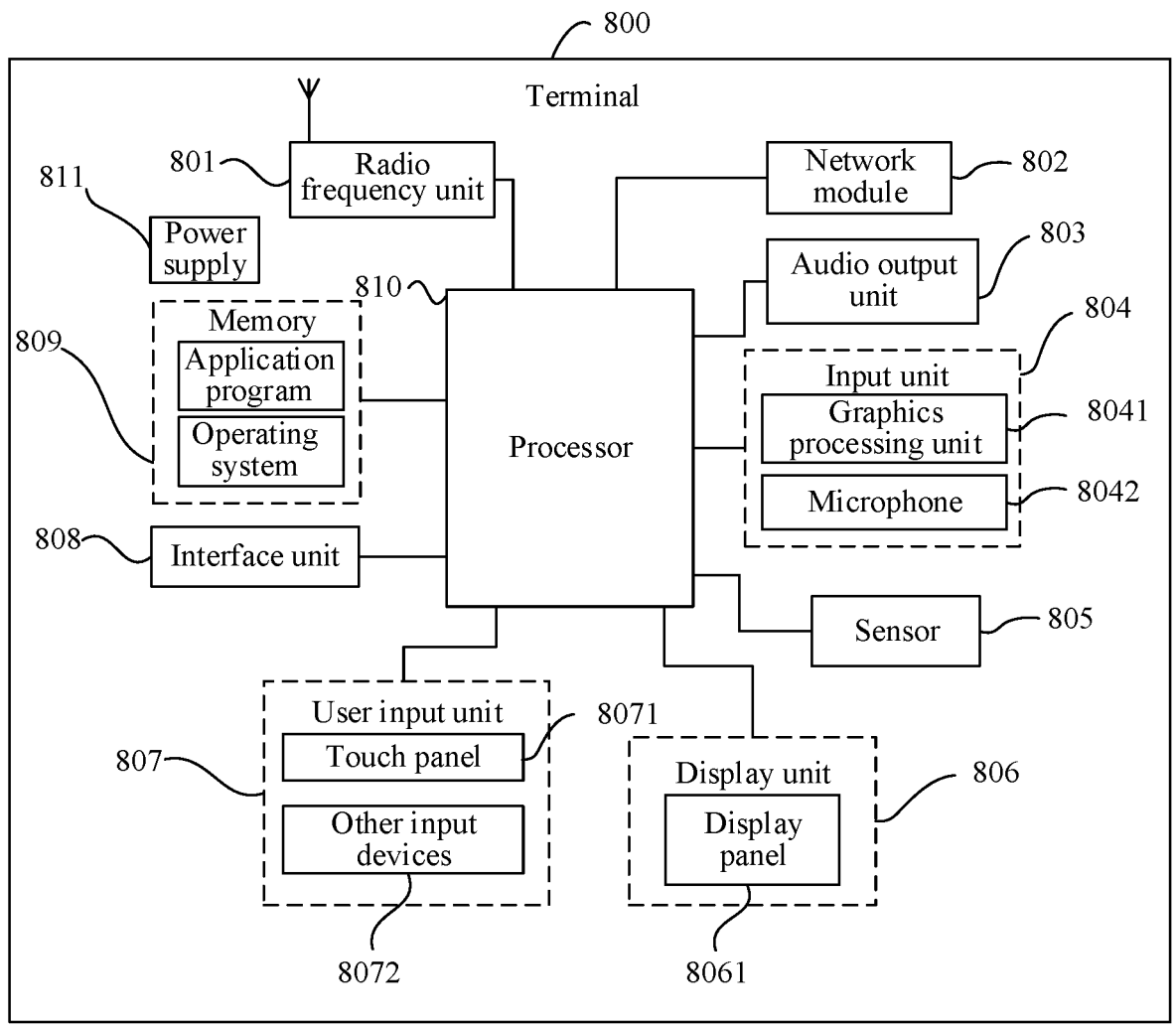
FIG. 7 is a schematic diagram of a hardware structure of a terminal according to an embodiment of this disclosure.

FIG. 7 is a schematic diagram of a hardware structure of a terminal for implementing the embodiments of this disclosure. The terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. A person skilled in the art can understand that the structure of the terminal shown in FIG. 8 does not constitute any limitation on the terminal, and the terminal may include more or fewer components than shown in the diagram, or some components may be combined, or the components may be arranged in different manners. In this embodiment of this disclosure, the terminal includes but is not limited to a mobile phone, a tablet computer, a notebook computer, a palmtop computer, an in-vehicle terminal, a wearable device, a pedometer, and the like.

The radio frequency unit 801 is configured to:

receive configuration information transmitted by a network-side device, where the configuration information is used to at least indicate measuring a layer 1 signal to interference plus noise ratio L1-SINR, the configuration information further includes channel measurement resource CMR information and interference measurement resource IMR information, and there is a preset association relationship between CMRs in the CMR information and IMRs in the IMR information.

The processor 810 is configured to:

determine, based on the preset association relationship, a target CMR and a target IMR for measuring a target L1-SINR; and measure the target CMR and the target IMR separately to obtain the target L1-SINR.

Optionally, the preset association relationship is configured by the network-side device; or the preset association relationship is specified by a protocol.

Optionally, the processor 810 is specifically configured to:

determine, based on the preset association relationship, a second resource associated with a first resource, where one of the first resource and the second resource is the target CMR, and the other is the target IMR.

Optionally, the processor 810 is specifically configured to:

determine, based on the preset association relationship, a third resource other than a second resource associated with a first resource, where one of the first resource and the third resource is the target CMR, and the other is the target IMR.

Optionally, the processor 810 is specifically configured to:

measure the target IMR by using quasi co-location QCL information of the target CMR.

The IMRs in the IMR information include at least one of ZP IMRs or NZP IMRs.

Optionally, the IMRs in the IMR information include ZP IMRs, and the preset association relationship includes one of the following:
the association relationship between the CMRs and the ZP IMRs is N-to-N association;
the association relationship between the CMRs and the ZP IMRs is one-to-one association;
N CMRs are associated with one ZP IMR; and
one CMR is associated with N ZP IMRs; where
N is a positive integer greater than 1.

Optionally, the IMRs in the IMR information include NZP IMRs, and the preset association relationship includes one of the following:
N CMRs are associated with one NZP IMR;
N NZP IMRs are associated with one CMR;
the association relationship between the CMRs and the NZP IMRs is one-to-one association; and
the CMRs are not associated with the NZP IMRs; where
N is a positive integer greater than 1.

Optionally, the IMRs in the IMR information include ZP IMRs and NZP IMRs, and the preset association relationship includes:
The association relationship among the CMRs, the ZP IMRs, and the NZP IMRs is one-to-M-to-N, where M and N are positive integers.

Optionally, the CMRs in the CMR information are periodic CMRs or semi-persistent CMRs or aperiodic CMRs.

Optionally, the IMRs in the IMR information are periodic IMRs or semi-persistent IMRs or aperiodic IMRs.

Optionally, the configuration information further includes an association relationship between transmission occasions of the CMRs and the IMRs.

Optionally, the configuration information is further used to indicate measuring a layer 1 reference signal received power L1-RSRP.

Optionally, the CMRs in the CMR information and the IMRs in the IMR information belong to different reference signal resource settings resource setting or belong to different resource sets resource set in the same resource setting.

Optionally, different CMRs in the CMR information belong to different resource settings; or
different CMRs in the CMR information belong to the same resource set in the same resource setting; or
different CMRs belong to different resource sets in the same resource setting.

Optionally, different IMRs in the IMR information belong to different resource settings; or
different IMRs in the IMR information belong to the same resource set in the same resource setting; or
different IMRs in the IMR information belong to different resource sets in the same resource setting.

In this embodiment of this disclosure, the association relationship between the CMRs and the IMRs for measuring an L1-SINR is preset, so that the terminal can select correct CMRs and IMRs according to the association relationship between the CMRs and the IMRs for channel measurement and interference measurement during measurement of the L1-SINR, thereby improving communication reliability of a communications system.

It should be understood that, in this embodiment of this disclosure, the radio frequency unit 801 may be configured to transmit and receive a signal in an information transmitting/receiving or call process. Specifically, the radio frequency unit 801 receives downlink data from a base station and transmits the downlink data to the processor 810 for processing; and transmits uplink data to the base station. Generally, the radio frequency unit 801 includes but is not limited to an antenna, at least one amplifier, a transceiver, a coupler, a low noise amplifier, a duplexer, and the like. In addition, the radio frequency unit 801 may also communicate with a network and other devices via a wireless communications system.

The terminal provides a user with wireless broadband Internet access by using the network module 802, for example, helping the user to transmit and receive e-mails, browse web pages, and access streaming media.

The audio output unit 803 may convert audio data into an audio signal, and output the audio signal as sound, where the audio data is received by the radio frequency unit 801 or the network module 802, or stored in the memory 809. In addition, the audio output unit 803 may further provide audio output (for example, a call signal received tone or a message received tone) that is related to a specific function performed by the terminal 800. The audio output unit 803 includes a speaker, a buzzer, a receiver, and the like.

The input unit 804 is configured to receive an audio or video signal. The input unit 804 may include a graphics processing unit (GPU) 8041 and a microphone 8042, and the graphics processing unit 8041 processes image data of a static picture or a video obtained by an image capture apparatus (for example, a camera) in an image capture mode or a video capture mode. A processed image frame may be displayed on the display unit 806. The image frame processed by the graphics processing unit 8041 may be stored in the memory 809 (or another storage medium) or transmitted by using the radio frequency unit 801 or the network module 802. The microphone 8042 is capable of receiving sounds and processing such sounds into audio data. The processed audio data can be converted in a telephone call mode into a format that can be transmitted by the radio frequency unit 801 to a mobile communication base station, for outputting.

The terminal 800 may further include at least one sensor 805, for example, an optical sensor, a motion sensor, and other sensors. Specifically, the optical sensor includes an ambient light sensor and a proximity sensor. The ambient light sensor may adjust luminance of a display panel 8061 based on brightness of ambient light, and the proximity sensor may turn off the display panel 8061 and backlight when the terminal 800 moves to an ear. As a motion sensor, an accelerometer sensor may detect magnitudes of accelerations in various directions (typically three axes), and in a stationary state, may detect the magnitude and direction of gravity, and may be applied for terminal posture recognition (for example, switching between a landscape orientation and a portrait orientation, related gaming, and magnetometer posture calibration), vibration recognition related functions (for example, pedometer and tapping), and the like. The sensor 805 may further include a fingerprint sensor, a pressure sensor, an iris sensor, a molecular sensor, a gyroscope, a barometer, a hygrometer, a thermometer, an infrared sensor, and the like. Details are not further described herein.

The display unit 806 is configured to display information input by the user or information provided to the user. The display unit 806 may include the display panel 8061. The display panel 8061 may be configured in a form of a liquid crystal display (LCD), an organic light-emitting diode (OLED), or the like.

The user input unit 807 may be configured to receive input digit or character information, and generate key signal input associated with user settings and function control of the terminal. Specifically, the user input unit 807 includes a touch panel 8071 and other input devices 8072. The touch panel 8071, or referred to as a touchscreen, may capture a touch operation performed by a user on or near the touch panel 8071 (for example, an operation performed by the user on the touch panel 8071 or near the touch panel 8071 by using any appropriate object or accessory such as a finger or a stylus). The touch panel 8071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 810, and receives and executes a command transmitted by the processor 810. In addition, the touch panel 8071 may be implemented in a plurality of forms, for example, as a resistive, capacitive, infrared, or surface acoustic wave touch panel. In addition to the touch panel 8071, the user input unit 807 may further include other input devices 8072. Specifically, the other input devices 8072 may include but are not limited to a physical keyboard, a function key (for example, a volume control key or a switch key), a trackball, a mouse, and a joystick. Details are not described herein.

Further, the touch panel 8071 may cover the display panel 8071. After detecting a touch operation on or near the touch panel 8071, the touch panel 8071 transmits the touch operation to the processor 810 to determine a type of a touch event. Then the processor 810 provides corresponding visual output on the display panel 8061 based on the type of the touch event. In FIG. 7, the touch panel 8071 and the display panel 8061 serve as two separate components to implement input and output functions of the terminal. However, in some embodiments, the touch panel 8071 and the display panel 8061 may be integrated to implement the input and output functions of the terminal. This is not specifically limited herein.

The interface unit 808 is an interface between an external apparatus and the terminal 800. For example, the external apparatus may include a wired or wireless headphone port, an external power (or battery charger) port, a wired or wireless data port, a memory card port, a port for connecting an apparatus with an identification module, an audio input/output (I/O) port, a video I/O port, or an earphone port. The interface unit 808 may be configured to receive an input (for example, data information or power) from the external apparatus and transmit the received input to one or more elements within the terminal 800, or may be configured to transmit data between the terminal 800 and the external apparatus.

The memory 809 may be configured to store software programs and various data. The memory 809 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 809 may include a high-speed random access memory, and may further include a non-volatile memory such as a disk storage device, a flash memory device, or another volatile solid-state storage device.

The processor 810 is a control center of the terminal that connects various parts of the entire terminal by using various interfaces or lines. The processor 810 performs various functions of the terminal and processes data by running or executing software programs and/or modules stored in the memory 809 and calling data stored in the memory 809, so as to perform overall monitoring on the terminal. The processor 810 may include one or more processing units. Optionally, the processor 810 may integrate an application processor and a modem processor. The application processor mainly processes an operating system, a user interface, an application program, and the like. The modem processor mainly processes wireless communication. It can be understood that the modem processor may alternatively be not integrated in the processor 810.

The terminal 800 may further include a power supply 811 (for example, a battery) that supplies power to the components. Optionally, the power supply 811 may be logically connected to the processor 810 through a power management system, so as to implement functions such as charging management, discharging management, and power consumption management through the power management system.

In addition, the terminal 800 includes some functional modules that are not shown. Details are not described herein.

Optionally, an embodiment of this disclosure further provides a terminal, including: a processor 810, a memory 809, and a computer program stored in the memory 809 and capable of running on the processor 810. When the computer program is executed by the processor 810, the processes in the foregoing embodiments of the measurement method are implemented, with the same technical effects achieved. To avoid repetition, details are not described herein again.

It should be noted that the terminal 800 in this embodiment may be the terminal in any implementation of the method embodiments of this disclosure. Any implementation of the terminal in the method embodiments of this disclosure can be implemented by the terminal 800 in this embodiment, and the same beneficial effect is achieved. Details are not described herein again.

Figure 8:
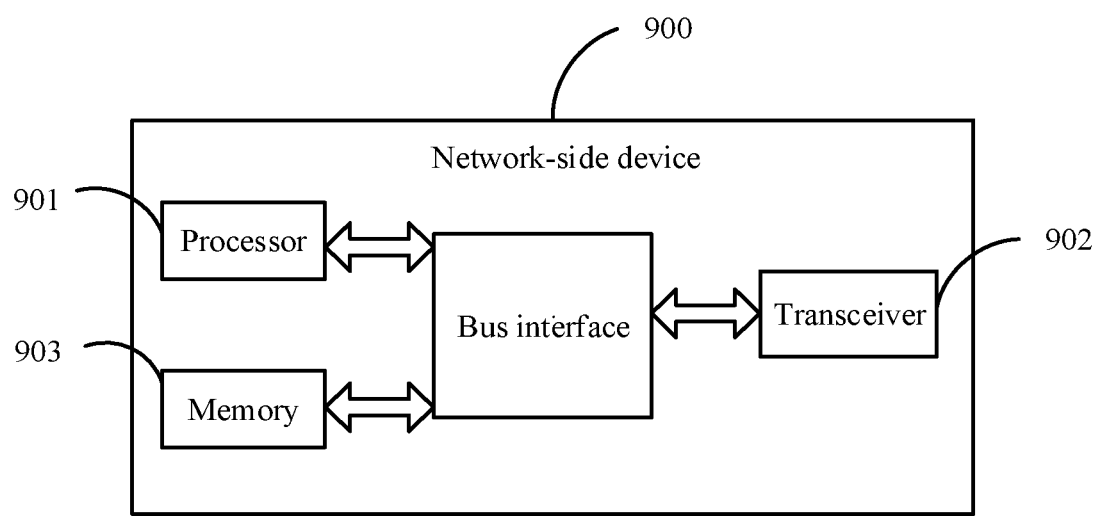
FIG. 8 is a schematic diagram of a hardware structure of a network-side device according to an embodiment of this disclosure.

FIG. 8 is a structural diagram of a network-side device according to an embodiment of this disclosure. As shown in FIG. 8, the network-side device 900 includes a processor 901, a transceiver 902, a memory 903, and a bus interface.

The transceiver 902 or the processor 901 is configured to:
transmit configuration information to a terminal, where the configuration information is used to at least indicate measuring a layer 1 signal to interference plus noise ratio L1-SINR, the configuration information further includes channel measurement resource CMR information and interference measurement resource IMR information, and there is a preset association relationship between CMRs in the CMR information and IMRs in the IMR information; and
transmit, according to the configuration information, a reference signal for measuring a target L1-SINR.

Optionally, the preset association relationship is configured by the network-side device; or
the preset association relationship is specified by a protocol.

Optionally, the IMRs in the IMR information include at least one of ZP IMRs or NZP IMRs.

Optionally, the IMRs in the IMR information include ZP IMRs,
and the preset association relationship includes one of the following:
the association relationship between the CMRs and the ZP IMRs is N-to-N association;
the association relationship between the CMRs and the ZP IMRs is one-to-one association;
N CMRs are associated with one ZP IMR; and
one CMR is associated with N ZP IMRs; where N is a positive integer greater than 1.

Optionally, the IMRs in the IMR information include NZP IMRs, and the preset association relationship includes one of the following:

N CMRs are associated with one NZP IMR;

N NZP IMRs are associated with one CMR;

the association relationship between the CMRs and the NZP IMRs is one-to-one association; and the CMRs are not associated with the NZP IMRs; where N is a positive integer greater than 1.

Optionally, the IMRs in the IMR information include ZP IMRs and NZP IMRs, and the preset association relationship includes:

the association relationship among the CMRs, the ZP IMRs, and the NZP IMRs is one-to-M-to-N, where M and N are positive integers.

Optionally, the CMRs in the CMR information are periodic CMRs or semi-persistent CMRs or aperiodic CMRs.

Optionally, the IMRs in the IMR information are periodic IMRs or semi-persistent IMRs or aperiodic IMRs.

Optionally, the configuration information further includes an association relationship between transmission occasions of the CMRs and the IMRs.

Optionally, the configuration information is further used to indicate measuring a layer 1 reference signal received power L1-RSRP.

Optionally, the CMRs in the CMR information and the IMRs in the IMR information belong to different reference signal resource settings resource setting or belong to different resource sets resource set in the same resource setting.

Optionally, different CMRs in the CMR information belong to different resource settings; or different CMRs in the CMR information belong to the same resource set in the same resource setting; or different CMRs in the CMR information belong to different resource sets in the same resource setting.

Optionally, different IMRs in the IMR information belong to different resource settings; or different IMRs in the IMR information belong to the same resource set in the same resource setting; or different IMRs in the IMR information belong to different resource sets in the same resource setting.

In FIG. 8, a bus architecture may include any quantity of interconnected buses and bridges, and specifically connect together various circuits of one or more processors represented by the processor 901 and a memory represented by the memory 903. The bus architecture may further interconnect various other circuits such as a peripheral device, a voltage regulator, and a power management circuit. These are all common sense in the art, and therefore are not further described in this specification. The bus interface provides an interface. The transceiver 902 may be a plurality of components, that is, the transceiver 902 includes a transmitter and a receiver, and provides a unit for communicating with various other apparatuses on a transmission medium. For different terminals, the user interface 904 may also be an interface that can be externally or internally connected to a required device. The connected device includes but is not limited to a keypad, a display, a speaker, a microphone, a joystick, and the like.

The processor 901 is responsible for bus architecture management and general processing. The memory 903 may store data used when the processor 901 performs an operation.

It should be noted that the network-side device 900 in this embodiment may be a network-side device in any implementation of the method embodiments of this disclosure. Any implementation of the network-side device in the method embodiments of this disclosure can be implemented by the network-side device 900 in this embodiment, and the same beneficial effect can be achieved. Details are not described herein again.

An embodiment of this disclosure further provides a computer-readable storage medium, where the computer-readable storage medium stores a computer program. When the computer program is executed by a processor, the processes of the method corresponding to a terminal or a network-side device in the foregoing embodiments are implemented, with the same technical effects achieved. To avoid repetition, details are not described herein again. For example, the computer-readable storage medium is a read-only memory (ROM), a random access memory (RAM), a magnetic disk, or an optical disc.

It should be noted that the terms "comprise", "include", or any of their variants in this specification are intended to cover a non-exclusive inclusion, such that a process, method, article, or apparatus that includes a list of elements includes not only those elements but also other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a preferred implementation. Based on such an understanding, the technical solutions of this disclosure essentially or a part thereof that contributes to related technologies may be embodied in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing descriptions are only specific embodiments of this disclosure, but are not intended to limit the protection scope of this disclosure. Any variation or replacement readily figured out by persons skilled in the art within the technical scope disclosed in this disclosure shall fall within the protection scope of this disclosure. Therefore, the protection scope of this disclosure shall be subject to the protection scope of the claims.

What is claimed is:

1. A measurement method, comprising:

receiving, by a terminal, configuration information transmitted by a network-side device, wherein the configuration information is used to at least indicate measuring a layer 1 signal to interference plus noise ratio (L1-SINR), the configuration information further comprises channel measurement resource (CMR) information and interference measurement resource (IMR) information, and there is a preset association relationship between CMRs in the CMR information and IMRs in the IMR information;

determining, by the terminal, based on the preset association relationship, a target CMR and a target IMR for measuring a target L1-SINR; and measuring, by the terminal, the target CMR and the target IMR separately to obtain the target L1-SINR;

wherein performing interference measurement on the target IMR comprises:

measuring the target IMR by using quasi co-location (QCL) information of the target CMR.

2. The method according to claim 1, wherein the determining, based on the preset association relationship, a target CMR and a target IMR for measuring a target L1-SINR by the terminal comprises:

determining, based on the preset association relationship, a second resource associated with a first resource, wherein one of the first resource and the second resource is the target CMR, and the other is the target IMR.

3. The method according to claim 1, wherein the determining, based on the preset association relationship, a target CMR and a target IMR for measuring a target L1-SINR by the terminal comprises:

determining, based on the preset association relationship, a third resource other than a second resource associated with a first resource, wherein one of the first resource and the third resource is the target CMR, and the other is the target IMR.

4. The method according to claim 1, wherein the IMRs in the IMR information comprise at least one of zero power IMRs or non-zero power IMRs.

5. The method according to claim 4, wherein the IMRs in the IMR information comprise the zero power IMRs, and the preset association relationship comprises one of the following:

the association relationship between the CMRs and the zero power IMRs is N-to-N association;

the association relationship between the CMRs and the zero power IMRs is one-to-one association;

N CMRs are associated with one zero power IMR; and one CMR is associated with N zero power IMRs; wherein N is a positive integer greater than 1.

6. The method according to claim 4, wherein the IMRs in the IMR information comprise the non-zero power IMRs, and the preset association relationship comprises one of the following:

N CMRs are associated with one non-zero power IMR;

N non-zero power IMRs are associated with one CMR;

the association relationship between the CMRs and the non-zero power IMRs is one-to-one association; and the CMRs are not associated with the non-zero power IMRs; wherein N is a positive integer greater than 1.

7. The method according to claim 4, wherein the IMRs in the IMR information comprise the zero power IMRs and the non-zero power IMRs, and the preset association relationship comprises:

the association relationship among the CMRs, the zero power IMRs, and the non-zero power IMRs is one-to-M-to-N association, wherein M and N are positive integers.

8. The method according to claim 1, wherein the CMRs in the CMR information are periodic CMRs or semi-persistent CMRs or aperiodic CMRs; or wherein the IMRs in the IMR information are periodic IMRs or semi-persistent IMRs or aperiodic IMRs.

9. The method according to claim 1, wherein the configuration information further comprises an association relationship between transmission occasions of the CMRs and the IMRs.

10. The method according to claim 1, wherein the configuration information is further used to indicate measuring a layer 1 reference signal received power (L1-RSRP).

11. The method according to claim 1, wherein the CMRs in the CMR information and the IMRs in the IMR information belong to different reference signal resource settings, or belong to different resource sets in the same resource setting.

12. The method according to claim 1, wherein different CMRs in the CMR information belong to different resource settings; or different CMRs in the CMR information belong to the same resource set in the same resource setting; or different CMRs in the CMR information belong to different resource sets in the same resource setting; or, wherein different IMRs in the IMR information belong to different resource settings; or different IMRs in the IMR information belong to the same resource set in the same resource setting; or different IMRs in the IMR information belong to different resource sets in the same resource setting.

13. The method according to claim 1, wherein the preset association relationship is configured by the network-side device; or the preset association relationship is specified by a protocol.

14. A terminal, comprising a processor, a memory, and a computer program stored in the memory and capable of running on the processor, wherein the computer program is executed by the processor to implement:

receiving configuration information transmitted by a network-side device, wherein the configuration information is used to at least indicate measuring a layer 1 signal to interference plus noise ratio (L1-SINR), the configuration information further comprises channel measurement resource (CMR) information and interference measurement resource (IMR) information, and there is a preset association relationship between CMRs in the CMR information and IMRs in the IMR information;

determining, based on the preset association relationship, a target CMR and a target IMR for measuring a target L1-SINR; and measuring the target CMR and the target IMR separately to obtain the target L1-SINR;

wherein the computer program is further executed by the processor to implement:

measuring the target IMR by using quasi co-location (QCL) information of the target CMR.

15. The terminal according to claim 14, wherein the IMRs in the IMR information comprise at least one of zero power IMRs or non-zero power IMRs.

16. The terminal according to claim 15, wherein the IMRs in the IMR information comprise the non-zero power IMRs, and the preset association relationship comprises one of the following:

N CMRs are associated with one non-zero power IMR;

N non-zero power IMRs are associated with one CMR;

the association relationship between the CMRs and the non-zero power IMRs is one-to-one association; and the CMRs are not associated with the non-zero power IMRs; wherein N is a positive integer greater than 1.

17. The terminal according to claim 14, wherein the CMRs in the CMR information and the IMRs in the IMR information belong to different reference signal resource settings, or belong to different resource sets in the same resource setting.

18. A non-transitory computer-readable storage medium, wherein the computer-readable storage medium stores a computer program, and the computer program is executed by a processor of a terminal to implement:
  receiving configuration information transmitted by a network-side device, wherein the configuration information is used to at least indicate measuring a layer 1 signal to interference plus noise ratio (L1-SINR), the configuration information further comprises channel measurement resource (CMR) information and interference measurement resource (IMR) information, and there is a preset association relationship between CMRs in the CMR information and IMRs in the IMR information;
  determining based on the preset association relationship, a target CMR and a target IMR for measuring a target L1-SINR; and
  measuring the target CMR and the target IMR separately to obtain the target L1-SINR;
  wherein performing interference measurement on the target IMR comprises:
    measuring the target IMR by using quasi co-location (QCL) information of the target CMR.

19. The non-transitory computer-readable storage medium according to claim 18, wherein the IMRs in the IMR information comprise at least one of zero power IMRs or non-zero power IMRs.

20. The non-transitory computer-readable storage medium according to claim 19,
  wherein the IMRs in the IMR information comprise the non-zero power IMRs,
  and the preset association relationship comprises one of the following:
    N CMRs are associated with one non-zero power IMR;
    N non-zero power IMRs are associated with one CMR;
    the association relationship between the CMRs and the non-zero power IMRs is one-to-one association; and
    the CMRs are not associated with the non-zero power IMRs; wherein
  N is a positive integer greater than 1.

* * * * *